(12) United States Patent
Cook

(10) Patent No.: US 11,245,931 B2
(45) Date of Patent: Feb. 8, 2022

(54) SYSTEM AND METHOD FOR RGBG CONVERSION

(71) Applicant: Samsung Display Co., Ltd., Yongin-si (KR)

(72) Inventor: Gregory W. Cook, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 244 days.

(21) Appl. No.: 16/657,803

(22) Filed: Oct. 18, 2019

(65) Prior Publication Data

US 2021/0076075 A1   Mar. 11, 2021

Related U.S. Application Data

(60) Provisional application No. 62/898,884, filed on Sep. 11, 2019.

(51) Int. Cl.
*G06K 9/36* (2006.01)
*H04N 19/85* (2014.01)
*H04N 19/186* (2014.01)

(52) U.S. Cl.
CPC .......... *H04N 19/85* (2014.11); *H04N 19/186* (2014.11)

(58) Field of Classification Search
CPC ......... G09G 3/2074; G09G 2340/0457; G09G 2360/18; G09G 5/02; G09G 5/005; G09G 2340/06; G09G 2340/02; G09G 2300/0452; H04N 19/85; H04N 19/186; H04N 19/182; H04N 19/42; H04N 1/41; H04N 9/67; H04N 9/8081; H04N 9/8042; H04N 9/8045; H04N 9/8047; H04N 9/8082; H04N 11/02; H04N 2009/8084; H04N 19/54; G06T 15/04; G06T 7/50; G06T 9/00; G06T 7/90; G06T 2207/10028

See application file for complete search history.

(56) References Cited

U.S. PATENT DOCUMENTS 5,130,786 A    7/1992   Murata et al.
5,539,468 A    7/1996   Suzuki et al.
(Continued)

FOREIGN PATENT DOCUMENTS

KR    10-2015-0034948    4/2015
KR    10-2019-0060909    6/2019

OTHER PUBLICATIONS

Notice of Allowance issued in U.S. Appl. No. 15/983,014 by the USPTO, dated Aug. 28, 2019, 7 pages.
(Continued)

*Primary Examiner* — Duy M Dang
(74) *Attorney, Agent, or Firm* — Lewis Roca Rothgerber Christie LLP

(57) ABSTRACT

A method of mapping red-green-blue-green (RGBG) format data to red-green-blue (RGB) format data, the method including receiving three RGBG pixel values for mapping to four RGB pixel values, the RGBG and RGB pixel values including red color components, green color components, and blue color components, mapping the red and blue color components and first three green color components of the RGBG pixel values to first three RGB pixel values, and mapping last three green color components of the RGBG pixel values to the red, green, and blue color components of a fourth RGB pixel value according to a mapping pattern.

20 Claims, 5 Drawing Sheets

(56) References Cited

U.S. PATENT DOCUMENTS

| | | | |
|---|---|---|---|
| 6,137,914 A | 10/2000 | Ligtenberg et al. | |
| 6,243,416 B1 | 6/2001 | Matsushiro et al. | |
| 6,668,086 B1 | 12/2003 | Enokida | |
| 6,819,793 B1 | 11/2004 | Reshetov et al. | |
| 7,202,912 B2 | 4/2007 | Aneja et al. | |
| 7,236,636 B2 | 6/2007 | Sakai et al. | |
| 7,321,693 B2 | 1/2008 | Kadowaki | |
| 7,576,888 B2 | 8/2009 | Sakai et al. | |
| 7,619,596 B2 | 11/2009 | Tada | |
| 7,750,938 B2 | 7/2010 | Grimes et al. | |
| 7,974,478 B2 | 7/2011 | Bashyam et al. | |
| 8,452,083 B2 | 5/2013 | Kambegawa | |
| 8,478,057 B1 | 7/2013 | Cui et al. | |
| 8,509,532 B2 | 8/2013 | Ushiku | |
| 8,533,166 B1 | 9/2013 | Sulieman et al. | |
| 8,553,301 B2 | 10/2013 | Tamura | |
| 8,599,925 B2 | 12/2013 | Srinivasan | |
| 8,659,793 B2 | 2/2014 | Takeishi | |
| 8,660,347 B2 | 2/2014 | Tamura | |
| 8,994,617 B2 | 3/2015 | Chaji et al. | |
| 8,995,763 B2 | 3/2015 | Clark | |
| 9,071,838 B2 * | 6/2015 | Cho | H04N 19/90 |
| 9,378,560 B2 | 6/2016 | Iourcha et al. | |
| 9,495,894 B2 | 11/2016 | Yamanaka et al. | |
| 9,584,696 B2 | 2/2017 | Beck | |
| 9,697,765 B2 | 7/2017 | Chung et al. | |
| 9,715,716 B2 | 7/2017 | Song et al. | |
| 9,773,455 B2 | 9/2017 | Chung et al. | |
| 9,812,067 B2 | 11/2017 | Yang et al. | |
| 9,830,890 B2 | 11/2017 | Zhou et al. | |
| 9,894,379 B2 | 2/2018 | Banerji et al. | |
| 9,905,162 B2 | 2/2018 | Yoo | |
| 9,966,035 B2 | 5/2018 | Kim et al. | |
| 10,515,612 B2 | 12/2019 | Mobasher et al. | |
| 2003/0043088 A1 | 3/2003 | Booth, Jr. et al. | |
| 2004/0061672 A1 | 4/2004 | Page et al. | |
| 2004/0153937 A1 | 8/2004 | Moon | |
| 2005/0225548 A1 | 10/2005 | Han et al. | |
| 2005/0280766 A1 | 12/2005 | Johnson et al. | |
| 2007/0230572 A1 | 10/2007 | Koto et al. | |
| 2008/0048951 A1 | 2/2008 | Naugler, Jr. et al. | |
| 2008/0317362 A1 | 12/2008 | Hosaki et al. | |
| 2009/0052772 A1 | 2/2009 | Speirs et al. | |
| 2009/0066613 A1 | 3/2009 | Nakamura et al. | |
| 2009/0148059 A1 | 6/2009 | Matsuda | |
| 2010/0257493 A1 | 10/2010 | Agarwal et al. | |
| 2010/0316137 A1 | 12/2010 | Long et al. | |
| 2011/0069076 A1 | 3/2011 | Lindholm et al. | |
| 2011/0148894 A1 | 6/2011 | Duprat et al. | |
| 2011/0188750 A1 | 8/2011 | Tamura | |
| 2011/0243469 A1 | 10/2011 | McAllister et al. | |
| 2012/0120043 A1 | 5/2012 | Cho et al. | |
| 2012/0147799 A1 | 6/2012 | Nagara et al. | |
| 2012/0320067 A1 | 12/2012 | Iourcha et al. | |
| 2013/0170558 A1 | 7/2013 | Zhang | |
| 2014/0055500 A1 | 2/2014 | Lai | |
| 2014/0160172 A1 | 6/2014 | Lee | |
| 2014/0168192 A1 | 6/2014 | Jeong et al. | |
| 2014/0176409 A1 | 6/2014 | Kim et al. | |
| 2014/0313360 A1 | 10/2014 | Lee et al. | |
| 2015/0002378 A1 | 1/2015 | Nathan et al. | |
| 2015/0015590 A1 | 1/2015 | Jeong et al. | |
| 2015/0117774 A1 | 4/2015 | Yang et al. | |
| 2015/0194096 A1 | 7/2015 | Chung et al. | |
| 2015/0243201 A1 | 8/2015 | Chung et al. | |
| 2016/0104411 A1 | 4/2016 | Nathan et al. | |
| 2016/0335741 A1 * | 11/2016 | Zhao | G09G 5/005 |
| 2016/0372033 A1 | 12/2016 | Yoo | |
| 2016/0373788 A1 | 12/2016 | Gamei et al. | |
| 2016/0379550 A1 | 12/2016 | Jiang et al. | |
| 2017/0122725 A1 | 5/2017 | Yeoh et al. | |
| 2017/0256024 A1 | 9/2017 | Abraham et al. | |
| 2017/0256193 A1 * | 9/2017 | Zhou | G09G 3/3607 |
| 2019/0181191 A1 | 6/2019 | Chen | |
| 2019/0289308 A1 | 9/2019 | Mobasher et al. | |

OTHER PUBLICATIONS

Office Action issued in U.S. Appl. No. 15/980,623 by the USPTO, dated Feb. 4, 2020, 6 pages.

Burrows, M., et al., "A Block-sorting Lossless Data Compression Algorithm", SRC Research Report 124, May 10, 1994, 24 pages, d i g i t a l Systems Research Center, Palo Alto, California.

"Burrows-Wheeler Transform CMSC 423", 2009, 26 pages.

EPO Extended Search Report dated Mar. 6, 2020, for corresponding European Patent Application No. 19191346.6, 8 pages.

Office Action issued in U.S. Appl. No. 16/292,181 by the USPTO, dated Apr. 9, 2020, 7 pages.

Syahrul, Elfitrin, et al., "Lossless Image Compression Using Burrows Wheeler Transform (Methods and Techniques)", 2008 IEEE International Conference on Signal Image Technology and Internet Based Systems, 2008, pp. 338-343.

U.S. Office Action dated Mar. 3, 2021, issued in U.S. Appl. No. 16/542,233 (15 pages).

Kang, Wei, et al., "Compressing Encrypted Data: A Permutation Approach", Fiftieth Annual Allerton Conference Allerton House, UIUC, Illinois, USA, Oct. 2012 (IEEE), (5 pages).

EPO Extended Search Report dated May 2, 2019, for corresponding European Patent Application No. 19162833.8 (15 pages).

Database Compendex [Online], Nov. 1976, Database accession No. EIX77090006481, 1 page.

Battail, Gerard, et al., "Decodage par repliques [Replication Coding]," with English Abstract, Annales Des Telecommunications, vol. 31, Nov. 1976, pp. 387-404.

EPO Extended Search Report dated Nov. 17, 2020, corresponding to European Patent Application No. 20169950.1, (32 pages).

EPO Extended Search Report dated Nov. 10, 2020, issued in corresponding European Patent Application No. 20195820.4 (10 pages).

Partial European Search Report for corresponding European Patent Application No. 20169950.1, dated Aug. 3, 2020, 31 pages.

* cited by examiner

SYSTEM AND METHOD FOR RGBG CONVERSION

CROSS-REFERENCE TO RELATED APPLICATION(S)

This application claims priority to, and the benefit of, U.S. Provisional Application No. 62/898,884 ("SYSTEM AND METHOD FOR RGBG/PENTILE COMPRESSION"), filed on Sep. 11, 2019, the entire content of which is incorporated herein by reference.

The present application is also related to U.S. patent application Ser. No. 16/542,233, filed on Aug. 15, 2019, which claims priority to, and the benefit of, U.S. Provisional Patent Application Ser. No. 62/851,872, filed May 23, 2019 and entitled "REDUNDANCY ASSISTED NOISE CONTROL FOR ACCUMULATED ITERATIVE COMPRESSION ERROR," the entire contents of which are hereby expressly incorporated by reference.

The present application is also related to U.S. Pat. No. 10,115,177, issued on Oct. 30, 2018, which claims priority to, and the benefit of, U.S. Provisional Patent Application Ser. No. 62/412,026 ("Online Texture Compression and Decompression in Hardware"), filed on Oct. 24, 2016, and U.S. Provisional Application No. 62/018,178, filed on Jun. 27, 2014, the entire contents of which are incorporated herein by reference.

FIELD

Aspects of embodiments of the present disclosure are generally related to memory compression and decompression systems.

BACKGROUND

Currently, the field of computing appears to be generally experiencing an increase of data. For example, in certain applications, such as video processing, generated data appears to be growing at an exponential rate. This rate of data growth has, in some cases, outpaced the increase in capacity of storage systems. Therefore, many computational systems store data in compressed form. As stored data may need to be consumed in uncompressed form, there is a need to decompress the stored data before it can be further processed.

In high definition display devices image compression is often used to lower transmission bandwidth and reduce memory utilization. Such display devices may have an internal codec that performs the image compression and decompression operations. The codec may be designed to handle only a particular data format (e.g., red-green-blue (RGB) data or red-green-blue-green (RGBG) data) and may be unsuitable for handling a data format for which it was not designed. For example, an RGB codec may not be suitable for handling input RGBG image data.

What is desired is a device capable of efficiently translating data of one format to another format, which matches the internal codec.

The above information disclosed in this Background section is only for enhancement of understanding of the present disclosure, and therefore it may contain information that does not form the prior art that is already known to a person of ordinary skill in the art.

SUMMARY

The present disclosure is generally directed to a data format converter capable of efficiently and losslessly mapping RGBG (red, green, blue, green) data format to a RGB (red, green, blue) data format, and vice versa.

According to some embodiments of the present disclosure, there is provided a method of mapping red-green-blue-green (RGBG) format data to red-green-blue (RGB) format data, the method including: receiving, by a data format converter, three RGBG pixel values for mapping to four RGB pixel values, the RGBG and RGB pixel values including red color components, green color components, and blue color components; mapping, by the data format converter, the red and blue color components and first three green color components of the RGBG pixel values to first three RGB pixel values; and mapping, by the data format converter, last three green color components of the RGBG pixel values to the red, green, and blue color components of a fourth RGB pixel value according to a mapping pattern.

In some embodiments, the receiving the three RGBG pixel values includes: receiving, by the data format converter, image data including a plurality of RGBG pixel values corresponding to a plurality of pixels of a display device; and dividing, by a data format converter, the plurality of RGBG pixel values into sets of three RGBG pixel values including the three RGBG pixel values.

In some embodiments, the dividing the plurality of RGBG pixel values includes: zero padding, by the data format converter, a last one of the sets of three RGBG pixel values with zeroes to make a length of the last one of the sets of three RGBG pixel values equal to an other one of the sets of three RGBG pixel values.

In some embodiments, the data format converter is configured to perform the mapping the red and blue color components and the first three green color components of the RGBG pixel values and the mapping the last three green color components of the RGBG pixel values for each one of the sets of three RGBG pixel values.

In some embodiments, the method further includes: supplying, by the data format converter, the mapped RGB pixel values to an RGB codec device configured to compress the mapped RGB pixel values to generate compressed RGB values, and to store the compressed RGB values in a memory for later retrieval.

In some embodiments, mapping the red and blue color components and the first three green color components of the RGBG pixel values includes: mapping, by the data format converter, the red color components of the RGBG pixel values to red color components of three of the RGB pixel values; mapping, by the data format converter, the blue color components of the RGBG pixel values to the blue color components of the first three RGB pixel values; and mapping, by the data format converter, first three green color components of the RGBG pixel values to the green color components of the first three RGB pixel values.

In some embodiments, the mapping the red color components of the RGBG pixel values to the red color components of three of the RGB pixel values includes: mapping, by the data format converter, a first red color component, a second red color component, and a third red component of the RGBG pixel values to a first red color component, a second red color component, and a third red component, respectively, of the three of RGB pixel values.

In some embodiments, the mapping the blue color components of the RGBG pixel values to blue color components of three of the RGB pixel values includes: mapping, by the data format converter, a first blue color component, a second blue color component, and a third blue component of the RGBG pixel values to a first blue color component, a second blue color component, and a third blue component, respectively, of the three of RGB pixel values.

In some embodiments, the mapping the first three green color components of the RGBG pixel values to the green color components of the first three RGB pixel values includes: mapping, by the data format converter, a first green color component, a second green color component, and a third green component of the RGBG pixel values to a first green color component, a second green color component, and a third green component, respectively, of the three of RGB pixel values.

In some embodiments, the mapping the last three green color components of the RGBG pixel values includes: mapping a fourth green color component, a fifth green color component, and a sixth green component of the RGBG pixel values to the red, green, and blue color components, respectively, of the fourth RGB pixel value.

In some embodiments, each of the RGBG pixel values corresponds to a pixel of a display, and wherein each one of the RGBG pixel values includes a red color component, two green color components, and a blue color component corresponding to a red sub-pixel, two-green sub-pixels, and a blue sub-pixel of the pixel of the display.

According to some embodiments of the present disclosure, there is provided a method of mapping red-green-blue (RGB) format data to red-green-blue-green (RGBG) format data, the method including: receiving, by a data format converter, four RGB pixel values for mapping to three RGBG pixel values, the RGB and RGBG pixel values including red color components, green color components, and blue color components; mapping, by the data format converter, first three RGB pixel values to the red and blue color components and first three green color components of the RGBG pixel values; and mapping, by the data format converter, red, green, and blue color components of a fourth RGB pixel value to last three green color components of the RGBG pixel values according to a mapping pattern.

In some embodiments, the receiving the four RGB pixel values includes: receiving, by the data format converter, image data including a plurality of RGB pixel values corresponding to a plurality of pixels of a display device; and dividing, by a data format converter, the plurality of RGB pixel values into sets of four RGB pixel values including the four RGB pixel values, wherein the data format converter is configured to perform the mapping the first three RGB pixel values and the red, green, and blue color components of the fourth RGB pixel value for each one of the sets of four RGB pixel values.

In some embodiments, the receiving the image data includes: receiving, by the data format converter, the RGB pixel values from an RGB codec device configured to decompress compressed RGB pixel values stored in a memory.

In some embodiments, mapping the first three RGB pixel values includes: mapping, by the data format converter, red color components of the first three RGB pixel values to the red color components of the RGBG pixel values; mapping, by the data format converter, the blue color components of the first three RGB pixel values to the blue color components of the RGBG pixel values; and mapping, by the data format converter, the green color components of the first three RGB pixel values to first three green color components of the RGBG pixel values.

In some embodiments, the mapping the red color components of the first three RGB pixel values to the red color components of the RGBG pixel values includes: mapping, by the data format converter, a first red color component, a second red color component, and a third red component of the first three RGB pixel values to a first red color component, a second red color component, and a third red component, respectively, of the RGBG pixel values.

In some embodiments, the mapping the blue color components of the first three RGB pixel values to the blue color components of the RGBG pixel values includes: mapping, by the data format converter, a first blue color component, a second blue color component, and a third blue component of the first three RGB pixel values to a first blue color component, a second blue color component, and a third blue component, respectively, of the RGBG pixel values.

In some embodiments, the mapping the green color components of the first three RGB pixel values to the first three green color components of the RGBG pixel values includes: mapping, by the data format converter, a first green color component, a second green color component, and a third green component of the three of RGB pixel values to a first green color component, a second green color component, and a third green component, respectively, of the RGBG pixel values.

In some embodiments, the mapping the red, green, and blue color components of the fourth RGB pixel value includes: mapping the red, green, and blue color components of the fourth RGB pixel value to a fourth green color component, a fifth green color component, and a sixth green component, respectively, of the RGBG pixel values.

According to some embodiments of the present disclosure, there is provided a data compression system including: a memory; a data format converter configured to receive red-green-blue-green (RGBG) image data and to generate red-green-blue (RGB) image data corresponding to the RGBG image data; and a codec device configured to compress the RGB image data and to store the compressed RGB image data in the memory, wherein the data format converter is further configured to perform: receiving three RGBG pixel values of the RGBG image data for mapping to four RGB pixel values of the RGB image data, the RGBG and RGB pixel values including red color components, green color components, and blue color components; mapping the red and blue color components and first three green color components of the three RGBG pixel values to first three RGB pixel values; and mapping last three green color components of the three RGBG pixel values to the red, green, and blue color components of a fourth RGB pixel value according to a mapping pattern.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a system and method for decompression, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A display device may include a codec capable of efficiently encoding/decoding data of a particular type. However, such codec may not be suitable for operating on data of a different type. For example, a reg-green-blue (RGB) codec capable of performing compression/decompression operations on RGB image data may not be suitable for handling image data having red-green-blue-green (RGBG) format.

The present disclosure is generally directed to a system and method for losslessly converting data of one format (e.g., RGBG/RGB) to data of another format (e.g., RGB/RGBG).

Figure 1:
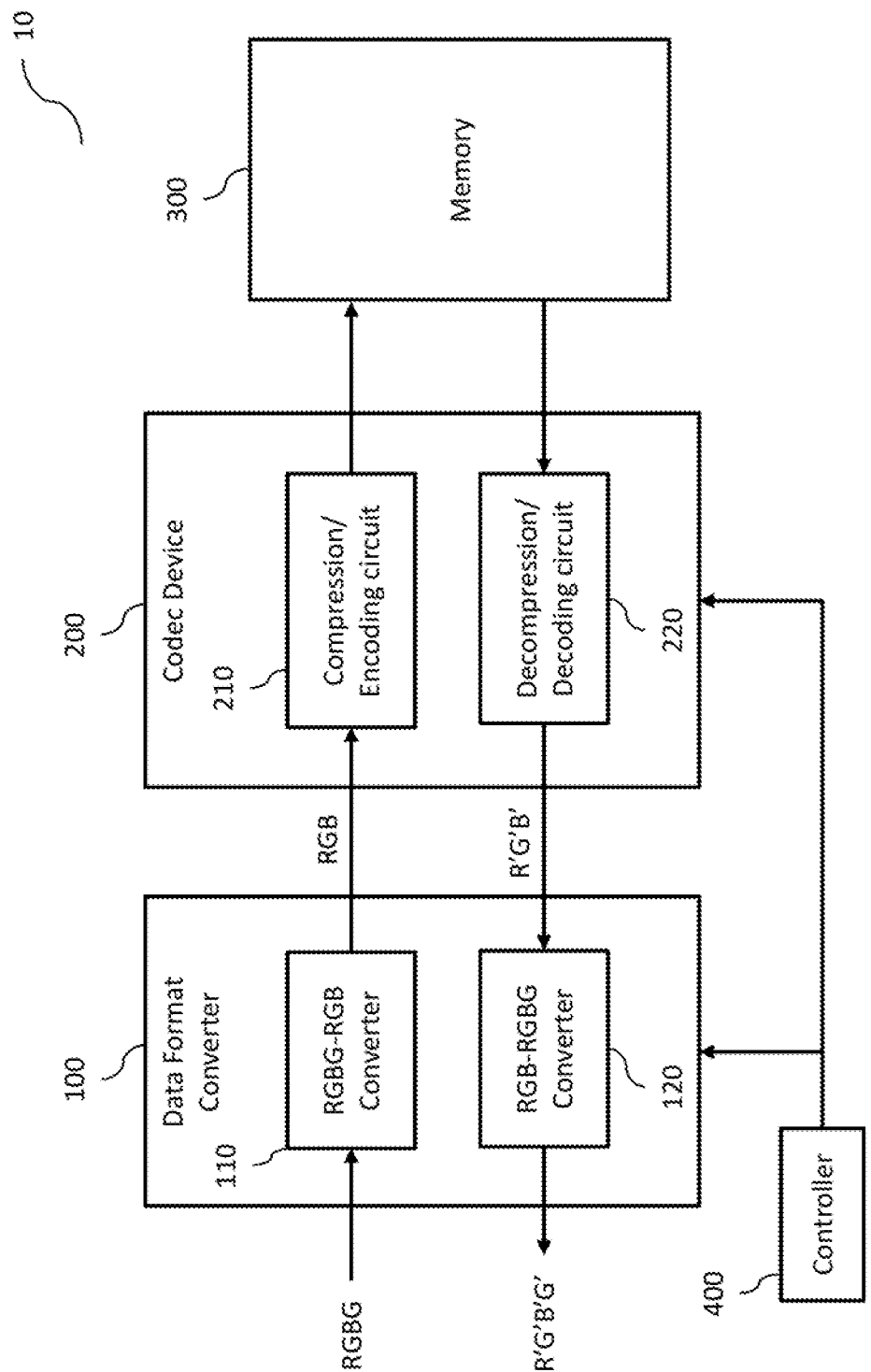
FIG. 1 shows a block diagram illustrating a data compression system, according to some example embodiments of the present disclosure.

FIG. 1 shows a block diagram illustrating a data compression system 10, according to some example embodiments of the present disclosure.

Referring to FIG. 1, the data compression system 10 includes a data format converter 100, a codec device 200, and a memory 300. In some embodiments, the data format converter 100 is configured to transform an image data of a first format (e.g., RGBG data) to a second format (e.g., RGB data) and vice versa. The codec device 200 may compress and/or encode the image of the second format to reduce its size and store the resulting data in the memory 300 for later retrieval. The codec device 200 may also perform the opposite operation on (e.g., decode/and or decompress) the stored data to obtain the original image data of the second format. The codec device may be According to some embodiments, the data format converter 100 includes a first converter (e.g., an RGBG-to-RGB converter) 110 that receives data of the first format (e.g., RGBG format) from an input device, and converts it to the second format (e.g., RGB) for further processing (e.g., by the codec device 200). In some examples, the data of the first format received from the input device may be the result of a mura compensation algorithm or a stress profile algorithm. The data format converter 100 further includes a second converter (e.g., an RGB-to-RGBG converter) 120 that receives data of the second format (e.g., RGB format), for example, from the codec device 200, and converts it to the first format (e.g., RGBG format), which may, for example, be used in mura compensation or stress profile compensation. The operations performed by the first and second converters 110 and 120 are completely lossless and reversible.

In some examples, the mapping operations of the data format converter 100 and the compression/encryption operations of the codec device may be controlled by the controller 400. For example, when input RGBG data is ready for storage in the memory 300, the controller 400 may prompt the data format converter 100 to map the RGBG data to standard RGB data, and prompts the codec device 200 to then process (e.g., compress and/or encrypt) the mapped RGB data for storage at the memory 300. Similarly, when it is desired to retrieve a previously-stored RGBG data, the controller 400 prompts the codec device 200 to process (e.g., decrypt and/or decompress) the corresponding RGB data stored at the memory to generate R'G'B' data, and prompts the data format converter 100 to map the R'G'B' data back to the RGBG configuration and generate the R'G'B'G' data. In examples in which the codec device 200 performs lossless operations (e.g., lossless compression/decompression and lossless encryption/decryption), the R'G'B'G' data is identical to the original RGBG data, since the mapping operations performed by the data format converter 100 are completely lossless and reversible. However, in examples in which the codec device 200 performs lossy operations (e.g., lossy compression/decompression and/or lossy encryption/decryption), the R'G'B'G' data may be slightly different from the original RGBG data.

Figure 2A:
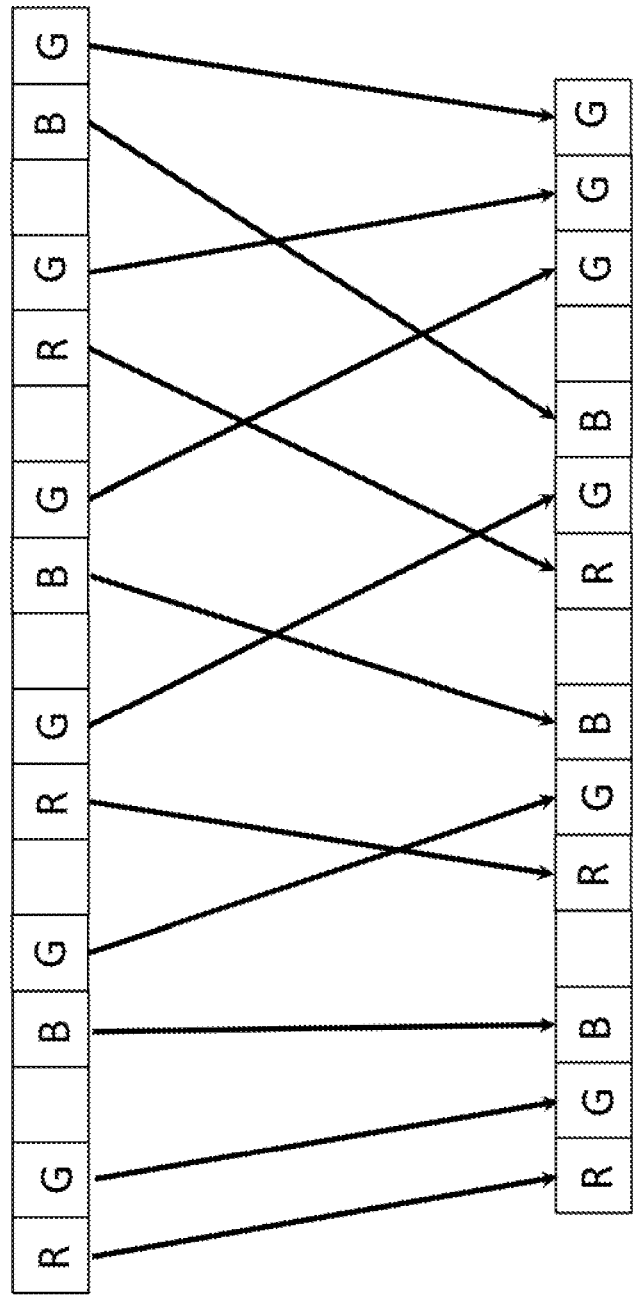
FIG. 2A illustrates a mapping of RGBG pixel values to RGB pixel values, according to some example embodiments of the present disclosure.
Figure 2B:
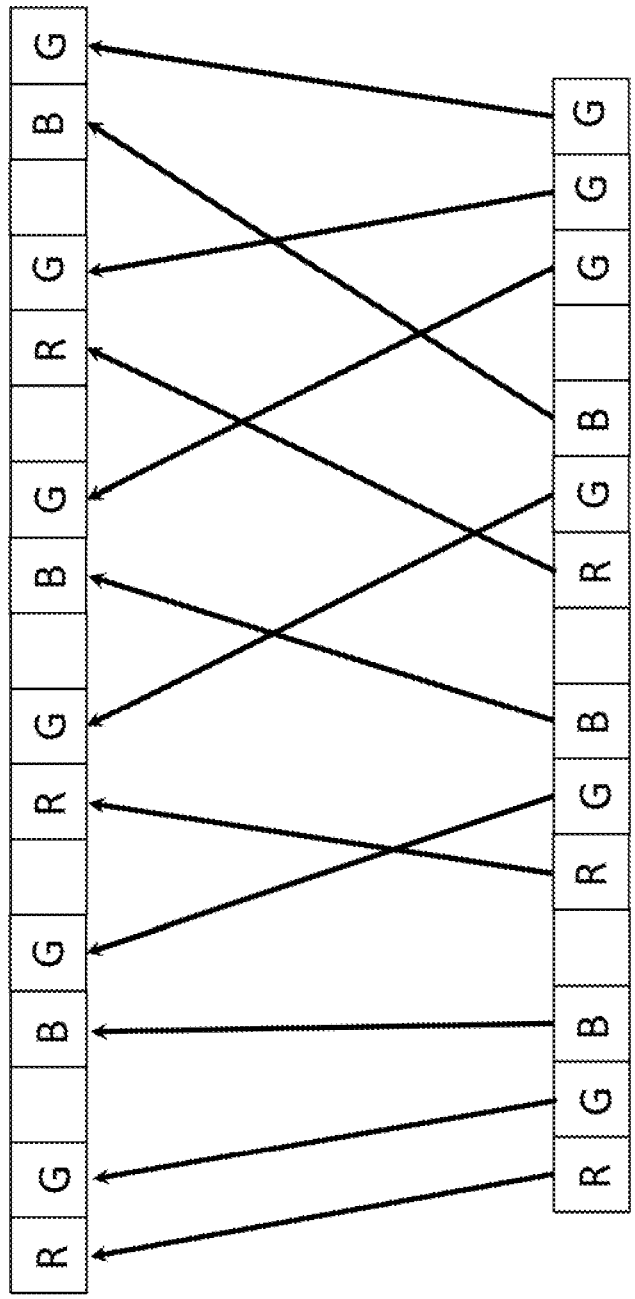
FIG. 2B illustrates a mapping of RGB pixel values to RGBG pixel values, according to some example embodiments of the present disclosure.

FIG. 2A illustrates a mapping of RGBG pixel values to RGB pixel values, according to some example embodiments of the present disclosure. FIG. 2B illustrates a mapping of RGB pixel values to RGBG pixel values, according to some example embodiments of the present disclosure.

According to some embodiments, the first converter 110 receives a set of three RGBG pixel values to map to a set of four RGB pixel values, as shown in FIG. 2. The three RGBG pixel values includes 3 red color components, 3 blue color components, and 6 green color components. As such, the set of three red, green, and blue color components may be mapped one-to-one to the red, green, and blue components of three RGB pixel values, and the remaining three green components of the three RGBG pixel values may be mapped to a single (e.g., fourth) RGB pixel value. This one-to-one transformation is completely lossless and reversible. That is, the reverse mapping may be applied to mapping the resulting four RGB pixel values of the above process to obtain the original set of three RGBG pixel values.

As shown in FIG. 2A, according to some embodiments, the first converter 110 maps individual components of the set of three RGBG pixel values to individual components of the set of four RGB pixels by: mapping the red color components of the three RGBG pixel values to the red color components of the first three RGB pixel values; mapping the blue color components of the three RGBG pixel values to the blue color components of the first three RGB pixel values; mapping the first three green color components of the six green color components of the three RGBG pixel values (i.e., the green color components of the first three half-pixel values) to the green color components of the first three RGB pixel value; and mapping the last three green color components of the six green color components of the three RGBG pixel values (i.e., the green color components of the last three half-pixel values) to the red, green, and blue color components of the fourth RGB pixel values according to a first mapping pattern. The first mapping pattern may be any suitable one-to-one mapping of three elements to three elements.

As shown in FIG. 2B, according to some embodiments, the second converter 120 maps individual components of the set of four RGB pixel values to individual components of the set of three RGBG pixels by: mapping the red color component of the first three RGB pixel values to the red color component of the three RGBG pixel values; mapping the blue color component of the three RGBG pixel values to the blue color component of the three RGBG pixel values; mapping the three green color components of the first three RGB pixel value to the first three green color components of the six green color components of the three RGBG pixel values (i.e., to the green color components of the first three half-pixel values); and mapping the red, green, and blue color components of the fourth RGB pixel values to the last three green color components of the six green color components of the three RGBG pixel values (i.e., to the green color components of the last three half-pixel values) according to a second mapping pattern, which is the inverse of the first mapping pattern.

The RGBG-to-RGB and the RGB-to-RGBG mapping operations described above can easily be parallelized in blocks of three RGBG pixel values (or equivalently, blocks of four RGB pixel values) to speed up the format conversion process for large sets of RGBG or RGB data. That is, the first converter may include a plurality of RGBG-to-RGB converters each operating on three RGBG pixel values to generate four RGB pixel values. Similarly, the second converter may include a plurality of RGB-to-RGBG converters each operating on four RGB pixel values to generate three RGBG pixel values.

The mapping process of FIG. 2A can be expressed in pseudo code as:

```
for (Int y = 0; y < image_height; y++)
{
    Int z = 0;
    for (Int x = 0; x < image_width; x += 4)
    {
        dstR[w*y + x + 0] = srcR[swR *       // red source component
            y + z + 0];
        dstB[w*y + x + 0] = srcB[swB *       // blue source component
            y + z + 0];
        dstG[w*y + x + 0] = srcG[swG *       // green source component
            y + 2 * z + 0];
        dstR[w*y + x + 1] = srcR[swR *
            y + z + 1];
        dstB[w*y + x + 1] = srcB[swB *
            y + z + 1];
        dstG[w*y + x + 1] = srcG[swG *
            y + 2 * z + 1];
        dstR[w*y + x + 2] = srcR[swR *
            y + z + 2];
        dstB[w*y + x + 2] = srcB[swB *
            y + z + 2];
        dstG[w*y + x + 2] = srcG[swG *
            y + 2 * z + 2];
        dstR[w*y + x + 3] = srcG[swR *       // green source component
            y + 2 * z + A];
        dstB[w*y + x + 3] = srcG[swB *       // green source component
            y + 2 * z + B];
        dstG[w*y + x + 3] = srcG[swG *       // green source component
            y + 2 * z + C];
        z += 3;
    }
}
``` where srcR, srcG, and srcB are one-dimensional arrays, which may be concatenations of two-dimensional color channel data, respectively corresponding to the red, green, and blue color channels of image data in RGBG format. Thus, each element of srcR, srcG, and srcB is a red color value, green color value, blue color value, respectively, of a pixel on the display. Additionally, dstR, dstB, and dstG are one-dimensional arrays corresponding to the red, green, and blue color channels of the mapped RGB data. The parameter image_width represents a width of the destination RGB image data (i.e., the number of pixels along a horizontal line of the image data), and image_height represents a height of the image data (i.e., the number of horizontal lines of pixels making up the image data). The parameters swR, swG, and swB represents the number of red, green, and blue color components, respectively, in a horizontal line of RGBG pixels of the image data. As there are twice as many green components in an RGBG pixel than red and blue components, there are twice as many elements in srcG as in srcB and srcR, and the value of swG is twice that of swR and swB. The values A, B, and C define the first mapping pattern and may be any permutation of 3, 4, and 5. In the example of FIG. 2A, the values A, B, and C are 3, 4, and 5, respectively; however, embodiments of the present disclosure are not limited thereto. For example, A, B, and C may respectively be 4, 3, 5, or 5, 3, 4, etc.

Similarly, according to some examples, the mapping process of FIG. 2B, which is the reversal of the operation provided above, may be expressed in pseudo code as:

```
for (Int y = 0; y < h; y++)
{
    Int z = 0;
    for (Int x = 0; x < w; x += 4)
    {
        dstR[dwR * y + z + 0]    = srcR[w*y + x + 0];
        dstB[dw2 * y + z + 0]    = srcB[w*y + x + 0];
        dstG[dwG * y + 2 * z + 0] = srcG[w*y + x + 0];
        dstR[dwR * y + z + 1]    = srcR[w*y + x + 1];
        dstB[dw2 * y + z + 1]    = srcB[w*y + x + 1];
        dstG[dwG * y + 2 * z + 1] = srcG[w*y + x + 1];
        dstR[dwR * y + z + 2]    = srcR[w*y + x + 2];
        dstB[dw2 * y + z + 2]    = srcB[w*y + x + 2];
        dstG[dwG * y + 2 * z + 2] = srcG[w*y + x + 2];
        dstG[dwG * y + 2 * z + A] =          // G destination component
            srcR[w*y + x + 3];
        dstG[dwG * y + 2 * z + B] =          // G destination component
            srcB[w*y + x + 3];
        dstG[dwG * y + 2 * z + C] =          // G destination component
            srcG[w*y + x + 3];
        z += 3;}
}
```

In some examples, the codec device 200 and the memory 300 may be part of a system for determining and compensating for the stress profile of a display device, which can reduce or eliminate display output decline by mitigating the effects of pixel degradation/aging in the display device. In other examples, the codec device 200 and the memory 300 may be part of a system capable of improving rendering performance while lowering energy consumption by compressing images during the rendering process. The compression may be lossless or near lossless, so as to not compromise the rendered result, and to ensure that the compressions and decompression remain transparent to the end user and applications.

When the compression utilized by the codec device 200 relies on the spatial correlation of color components (i.e., is a lossy compression), the RGBG-to-RGB mapping described above may result in a minor drop in compression performance due to the spatial decorrelation of some of the green subpixels/components.

Thus, in the case of lossy compression/decompression of the codec device 200, RGBG pixel values that are processed and stored by the processing system 10 may be retrieved as R'G'B'G' pixels values, which may be slightly different from the original RGBG pixel values, despite the lossless transformations performed by the data format converter 100.

Figure 3A:
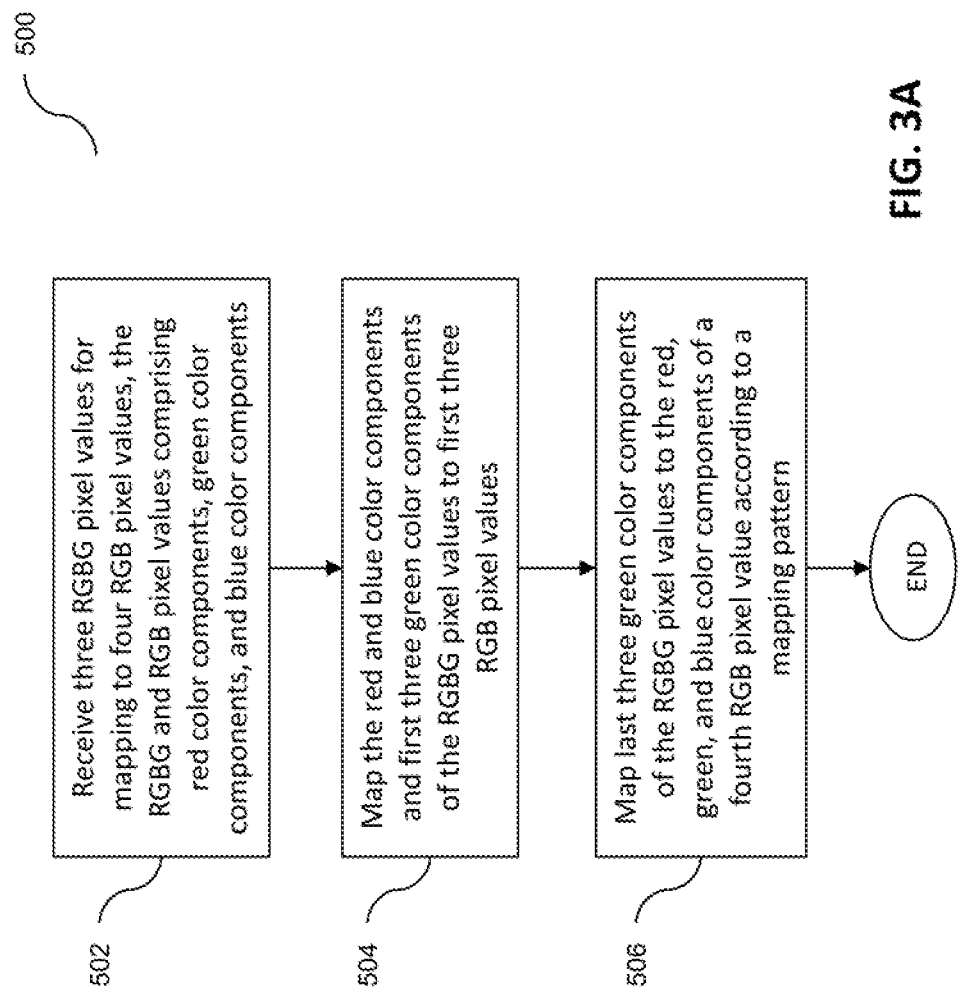
FIG. 3A illustrates a process for mapping RGBG format data to RGB format data, according to some example embodiments of the present disclosure.

FIG. 3A illustrates a process 500 for mapping RGBG format data to RGB format data, according to some example embodiments of the present disclosure.

Referring to FIG. 3A, according to some embodiments, the data format converter 100 (e.g., the first data converter 110) receives three RGBG pixel values for mapping to four RGB pixel values (502). The receiving of the three RGBG pixel values may include receiving image data comprising a plurality of RGBG pixel values corresponding to a plurality of pixels of a display device, and dividing (or grouping) the plurality of RGBG pixel values into sets of three RGBG pixel values comprising the three RGBG pixel values. In some examples, the dividing the plurality of RGBG pixel values may include zero padding a last one of the sets of three RGBG pixel values with zeroes to make a length of the last one of the sets of three RGBG pixel values equal to another one of the sets of three RGBG pixel values. The RGBG and RGB pixel values comprises red color components, green color components, and blue color components.

In some embodiments, the data format converter 100 maps the red and blue color components and first three green color components of the RGBG pixel values to first three RGB pixel values (504). The data format converter 100 may do so for each one of the sets of three RGBG pixel values. The data format converter 100 may do so by mapping the red color components of the RGBG pixel values to red color components of three of the RGB pixel values, mapping the blue color components of the RGBG pixel values to the blue color components of the first three RGB pixel values, and mapping first three green color components of the RGBG pixel values one-to-one to the green color components of the first three RGB pixel values. In some examples, for each color of red, green, and blue, the data format converter 100 may map the first, second, and third components of that color of the RGBG pixel values to a first, second, and third component of that color of the three of RGB pixel values, respectively.

According to some embodiments, the data format converter 100 maps the last three green color components of the RGBG pixel values to the red, green, and blue color components of a fourth RGB pixel value according to a mapping pattern (506). The data format converter 100 may map a fourth green color component, a fifth green color component, and a sixth green component of the RGBG pixel values to the red, green, and blue color components, respectively, of the fourth RGB pixel value.

In some embodiments, the data format converter 100 then supplies the mapped RGB pixel values to an RGB codec device 200 that is configured to compress (and/or encode) the mapped RGB pixel values to generate compressed (and/or encoded) RGB values, and to store the compressed (and/or encoded) RGB values in the memory 300 for later retrieval.

As described herein, each of the RGBG pixel values may correspond to a pixel of a display, and each one of the RGBG pixel values includes a red color component, two green color components, and a blue color component corresponding to a red sub-pixel, two-green sub-pixels, and a blue sub-pixel of the pixel of the display.

Figure 3B:
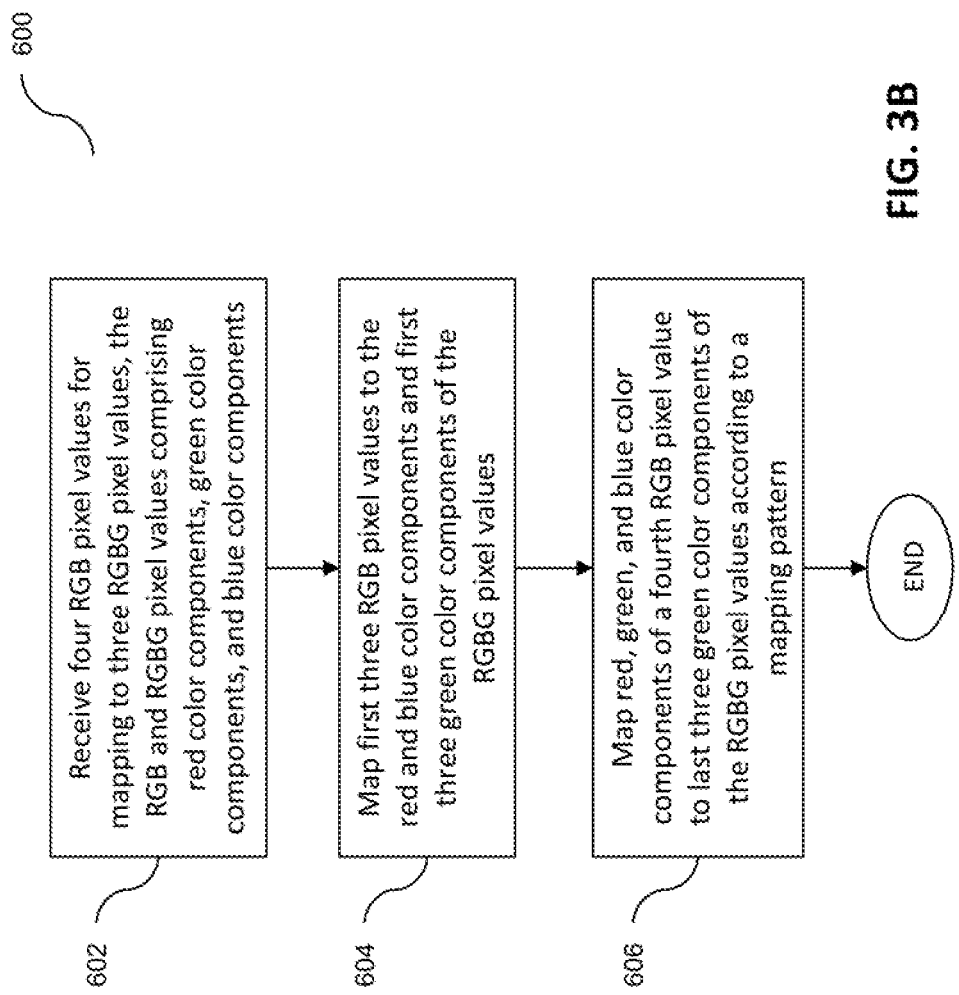
FIG. 3B illustrates a process for mapping RGB format data to RGBG format data, according to some example embodiments of the present disclosure.

FIG. 3B illustrates a process 600 for mapping RGB format data to RGBG format data, according to some example embodiments of the present disclosure.

Referring to FIG. 3B, according to some embodiments, the data format converter 100 (e.g., the second data converter 120) receives four RGB pixel values for mapping to three RGBG pixel values (602). The receiving of the four RGB pixel values may include receiving image data comprising a plurality of RGB pixel values corresponding to a plurality of pixels of a display device, and dividing (or grouping) the plurality of RGB pixel values into sets of four RGB pixel values comprising the four RGB pixel values. The data format converter 100 may perform the mapping of the first three RGB pixel values and the red, green, and blue color components of the fourth RGB pixel value for each one of the sets of four RGB pixel values. In some examples, the data format converter 100 may receive the RGB pixel values from an RGB codec device 200 configured to decompress (and/or decode) compressed (and/or encoded) RGB pixel values stored in a memory 300.

In some embodiments, the data format converter 100 maps the first three RGB pixel values to the red and blue color components and first three green color components of the RGBG pixel values (604). The data format converter 100 may do so by mapping red color components of the first three RGB pixel values to the red color components of the RGBG pixel values, mapping the blue color components of the first three RGB pixel values to the blue color components of the RGBG pixel values, and mapping the green color components of the first three RGB pixel values to first three green color components of the RGBG pixel values. In some examples, for each color of red, green, and blue, the data format converter 100 may map the first, second, and third components of that color of first three RGB pixel values to a first, second, and third component of that color of the RGBG pixel values, respectively.

According to some embodiments, the data format converter 100 maps red, green, and blue color components of a fourth RGB pixel value to last three green color components of the RGBG pixel values according to a mapping pattern (606). In some examples, the data format converter 100 may do so by mapping the red, green, and blue color components of the fourth RGB pixel value to a fourth green color component, a fifth green color component, and a sixth green component, respectively, of the RGBG pixel values.

Accordingly, the data format converter, according to some embodiments, enables the mapping of RGBG/Pentile configuration to a standard RGB configuration, which allows for the use of an RGB compression algorithm with no changes. This mapping algorithm readily lends itself to being parallelized in order to increase the speed of the mapping/conversion operation. These and other aspects enable the storage of native RGBG data without modification to the internal codec.

As will be recognized by a person of ordinary skill in the art, while the operations of processes 500 and 600 were described in a particular order, embodiments of the present disclosure are not limited thereto, and the order of the described operations may be changed in any suitable manner so long as the reordered process 500 is the inverse of the reordered process 600.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or"

includes any and all combinations of one or more of the associated listed items. Further, the use of "may" when describing embodiments of the inventive concept refers to "one or more embodiments of the inventive concept". Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "use", "using", and "used" may be considered synonymous with the terms "utilize", "utilizing", and "utilized", respectively.

The decompression system and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the compression system may be implemented on a flexible printed circuit film, a tape carrier package (TCP), a printed circuit board (PCB), or formed on the same substrate. Further, the various components of the compression system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of mapping red-green-blue-green (RGBG) format data to red-green-blue (RGB) format data, the method comprising:
   receiving, by a data format converter, three RGBG pixel values for mapping to four RGB pixel values, the RGBG and RGB pixel values comprising red color components, green color components, and blue color components;
   mapping, by the data format converter, the red and blue color components and first three green color components of the RGBG pixel values to first three RGB pixel values, each of the first three RGB pixel values having a sequential red-green-blue data format; and
   mapping, by the data format converter, last three green color components of the RGBG pixel values to the red, green, and blue color components of a fourth RGB pixel value according to a mapping pattern.

2. The method of claim 1, wherein the receiving the three RGBG pixel values comprises:
   receiving, by the data format converter, image data comprising a plurality of RGBG pixel values corresponding to a plurality of pixels of a display device; and
   dividing, by a data format converter, the plurality of RGBG pixel values into sets of three RGBG pixel values comprising the three RGBG pixel values.

3. The method of claim 2, wherein the data format converter is configured to perform the mapping the red and blue color components and the first three green color components of the RGBG pixel values and the mapping the last three green color components of the RGBG pixel values for each one of the sets of three RGBG pixel values.

4. The method of claim 1, further comprising:
   supplying, by the data format converter, the mapped RGB pixel values to an RGB codec device configured to compress the mapped RGB pixel values to generate compressed RGB values, and to store the compressed RGB values in a memory for later retrieval.

5. The method of claim 1, wherein mapping the red and blue color components and the first three green color components of the RGBG pixel values comprises:
   mapping, by the data format converter, the red color components of the RGBG pixel values to red color components of three of the RGB pixel values;
   mapping, by the data format converter, the blue color components of the RGBG pixel values to the blue color components of the first three RGB pixel values; and
   mapping, by the data format converter, first three green color components of the RGBG pixel values to the green color components of the first three RGB pixel values.

6. The method of claim 5, wherein the mapping the red color components of the RGBG pixel values to the red color components of three of the RGB pixel values comprises:
   mapping, by the data format converter, a first red color component, a second red color component, and a third red component of the RGBG pixel values to a first red color component, a second red color component, and a third red component, respectively, of the three of RGB pixel values.

7. The method of claim 5, wherein the mapping the blue color components of the RGBG pixel values to blue color components of three of the RGB pixel values comprises:

mapping, by the data format converter, a first blue color component, a second blue color component, and a third blue component of the RGBG pixel values to a first blue color component, a second blue color component, and a third blue component, respectively, of the three of RGB pixel values.

8. The method of claim 5, wherein the mapping the first three green color components of the RGBG pixel values to the green color components of the first three RGB pixel values comprises:
mapping, by the data format converter, a first green color component, a second green color component, and a third green component of the RGBG pixel values to a first green color component, a second green color component, and a third green component, respectively, of the three of RGB pixel values.

9. The method of claim 1, wherein the mapping the last three green color components of the RGBG pixel values comprises:
mapping a fourth green color component, a fifth green color component, and a sixth green component of the RGBG pixel values to the red, green, and blue color components, respectively, of the fourth RGB pixel value.

10. The method of claim 1, wherein each of the RGBG pixel values corresponds to a pixel of a display, and
wherein each one of the RGBG pixel values comprises a red color component, two green color components, and a blue color component corresponding to a red sub-pixel, two-green sub-pixels, and a blue sub-pixel of the pixel of the display.

11. A method of mapping red-green-blue-green (RGBG) format data to red-green-blue (RGB) format data, the method comprising:
receiving, by a data format converter, three RGBG pixel values for mapping to four RGB pixel values, the RGBG and RGB pixel values comprising red color components, green color components, and blue color components;
mapping, by the data format converter, the red and blue color components and first three green color components of the RGBG pixel values to first three RGB pixel values; and
mapping, by the data format converter, last three green color components of the RGBG pixel values to the red, green, and blue color components of a fourth RGB pixel value according to a mapping pattern,
wherein the receiving the three RGBG pixel values comprises:
receiving, by the data format converter, image data comprising a plurality of RGBG pixel values corresponding to a plurality of pixels of a display device; and
dividing, by a data format converter, the plurality of RGBG pixel values into sets of three RGBG pixel values comprising the three RGBG pixel values, and
wherein the dividing the plurality of RGBG pixel values comprises:
zero padding, by the data format converter, a last one of the sets of three RGBG pixel values with zeroes to make a length of the last one of the sets of three RGBG pixel values equal to an other one of the sets of three RGBG pixel values.

12. A method of mapping red-green-blue (RGB) format data to red-green-blue-green (RGBG) format data, the method comprising:

receiving, by a data format converter, four RGB pixel values for mapping to three RGBG pixel values, the RGB and RGBG pixel values comprising red color components, green color components, and blue color components;
mapping, by the data format converter, first three RGB pixel values to the red and blue color components and first three green color components of the RGBG pixel values, each of the first three RGB pixel values having a sequential red-green-blue data format; and
mapping, by the data format converter, red, green, and blue color components of a fourth RGB pixel value to last three green color components of the RGBG pixel values according to a mapping pattern.

13. The method of claim 12, wherein the receiving the four RGB pixel values comprises:
receiving, by the data format converter, image data comprising a plurality of RGB pixel values corresponding to a plurality of pixels of a display device; and
dividing, by a data format converter, the plurality of RGB pixel values into sets of four RGB pixel values comprising the four RGB pixel values,
wherein the data format converter is configured to perform the mapping the first three RGB pixel values and the red, green, and blue color components of the fourth RGB pixel value for each one of the sets of four RGB pixel values.

14. The method of claim 13, wherein the receiving the image data comprises:
receiving, by the data format converter, the RGB pixel values from an RGB codec device configured to decompress compressed RGB pixel values stored in a memory.

15. The method of claim 12, wherein mapping the first three RGB pixel values comprises:
mapping, by the data format converter, red color components of the first three RGB pixel values to the red color components of the RGBG pixel values;
mapping, by the data format converter, the blue color components of the first three RGB pixel values to the blue color components of the RGBG pixel values; and
mapping, by the data format converter, the green color components of the first three RGB pixel values to first three green color components of the RGBG pixel values.

16. The method of claim 15, wherein the mapping the red color components of the first three RGB pixel values to the red color components of the RGBG pixel values comprises:
mapping, by the data format converter, a first red color component, a second red color component, and a third red component of the first three RGB pixel values to a first red color component, a second red color component, and a third red component, respectively, of the RGBG pixel values.

17. The method of claim 15, wherein the mapping the blue color components of the first three RGB pixel values to the blue color components of the RGBG pixel values comprises:
mapping, by the data format converter, a first blue color component, a second blue color component, and a third blue component of the first three RGB pixel values to a first blue color component, a second blue color component, and a third blue component, respectively, of the RGBG pixel values.

18. The method of claim 15, wherein the mapping the green color components of the first three RGB pixel values to the first three green color components of the RGBG pixel values comprises:

mapping, by the data format converter, a first green color component, a second green color component, and a third green component of the three of RGB pixel values to a first green color component, a second green color component, and a third green component, respectively, of the RGBG pixel values.

19. The method of claim 12, wherein the mapping the red, green, and blue color components of the fourth RGB pixel value comprises:
mapping the red, green, and blue color components of the fourth RGB pixel value to a fourth green color component, a fifth green color component, and a sixth green component, respectively, of the RGBG pixel values.

20. A data compression system comprising:
a memory;
a data format converter configured to receive red-green-blue-green (RGBG) image data and to generate red-green-blue (RGB) image data corresponding to the RGBG image data; and
a codec device configured to compress the RGB image data and to store the compressed RGB image data in the memory,
wherein the data format converter is further configured to perform:
receiving three RGBG pixel values of the RGBG image data for mapping to four RGB pixel values of the RGB image data, the RGBG and RGB pixel values comprising red color components, green color components, and blue color components;
mapping the red and blue color components and first three green color components of the three RGBG pixel values to first three RGB pixel values, each of the first three RGB pixel values having a sequential red-green-blue data format; and
mapping last three green color components of the three RGBG pixel values to the red, green, and blue color components of a fourth RGB pixel value according to a mapping pattern.

\* \* \* \* \*